United States Patent
Yan

(10) Patent No.: US 9,069,168 B2
(45) Date of Patent: Jun. 30, 2015

(54) MEANS FOR SETTING SEPARATION WALLS WITH PREDETERMINED HEIGHTS AND SHAPES ON KEYPADS TO PREVENT UNINTENDED KEY HITS

(76) Inventor: Yong Yan, Sunnyvale, CA (US)

( * ) Notice: Subject to any disclaimer, the term of this patent is extended or adjusted under 35 U.S.C. 154(b) by 530 days.

(21) Appl. No.: 13/464,886

(22) Filed: May 4, 2012

(65) Prior Publication Data

US 2013/0293398 A1    Nov. 7, 2013

(51) Int. Cl.
G08B 21/00 (2006.01)
G02B 26/08 (2006.01)
H01H 13/84 (2006.01)

(52) U.S. Cl.
CPC .............. *G02B 26/08* (2013.01); *H01H 13/84* (2013.01); *H01H 2217/018* (2013.01); *H01H 2219/054* (2013.01); *H01H 2219/064* (2013.01); *H01H 2223/034* (2013.01); *H01H 2223/046* (2013.01)

(58) Field of Classification Search
CPC .. H01H 13/84; H01H 2219/064; H03M 11/06
USPC ...................................... 341/22, 24
See application file for complete search history.

(56) References Cited

U.S. PATENT DOCUMENTS

| | | | | |
|---|---|---|---|---|
| 5,286,125 | A * | 2/1994 | DiGiosia | 400/715 |
| 7,324,019 | B2 * | 1/2008 | Levenson | 341/22 |
| 2001/0038766 | A1 * | 11/2001 | Euley et al. | 400/492 |
| 2002/0171564 | A1 * | 11/2002 | Jam | 341/23 |
| 2004/0046744 | A1 * | 3/2004 | Rafii et al. | 345/168 |
| 2010/0258710 | A1 * | 10/2010 | Wiese et al. | 250/214.1 |

* cited by examiner

*Primary Examiner* — Mark Rushing

(57) ABSTRACT

A method of utilizing raised parts on a keypad surface, called separation walls, is disclosed. Separation walls can help prevent unintended key hits so that keys can be smaller and be placed with higher densities on small devices. Separation walls with slits can also make light beam keypads operable with multiple fingers at a higher input speed.

3 Claims, 2 Drawing Sheets

Separation walls with slits for light beam keyboard

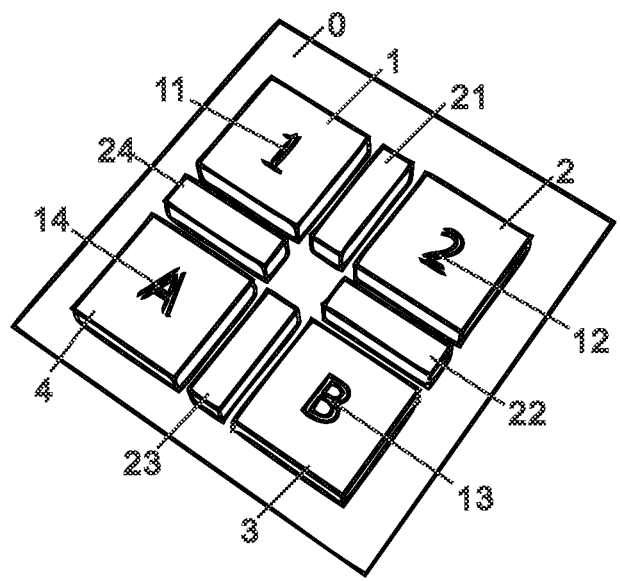
Fig. 1 Keys and separation walls raised above the base
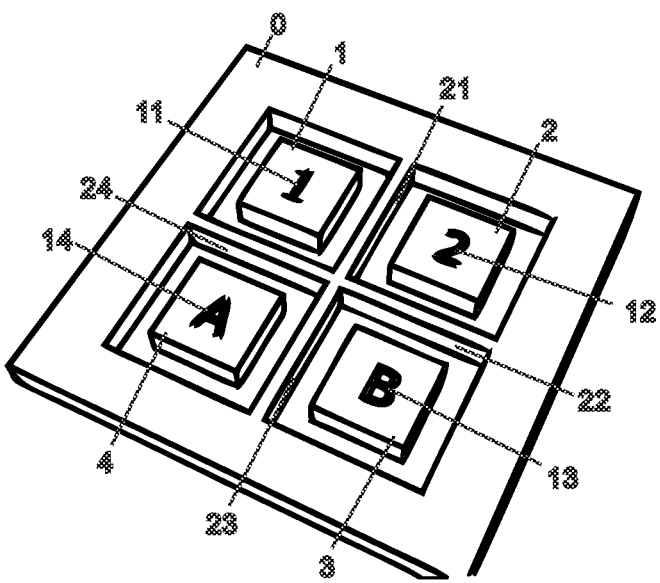
Fig. 2 Keys within the cavities formed by the separation walls

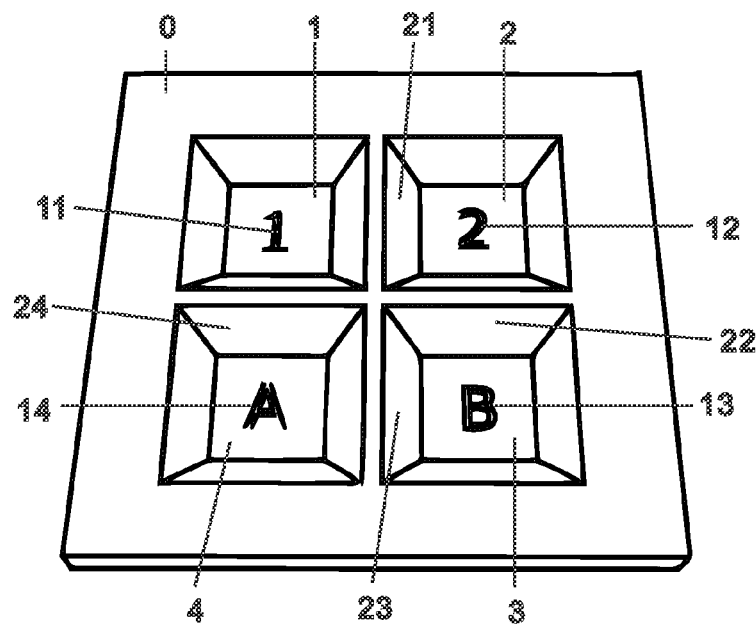
Fig. 3 Keys lower than the separation walls and enclosure surface
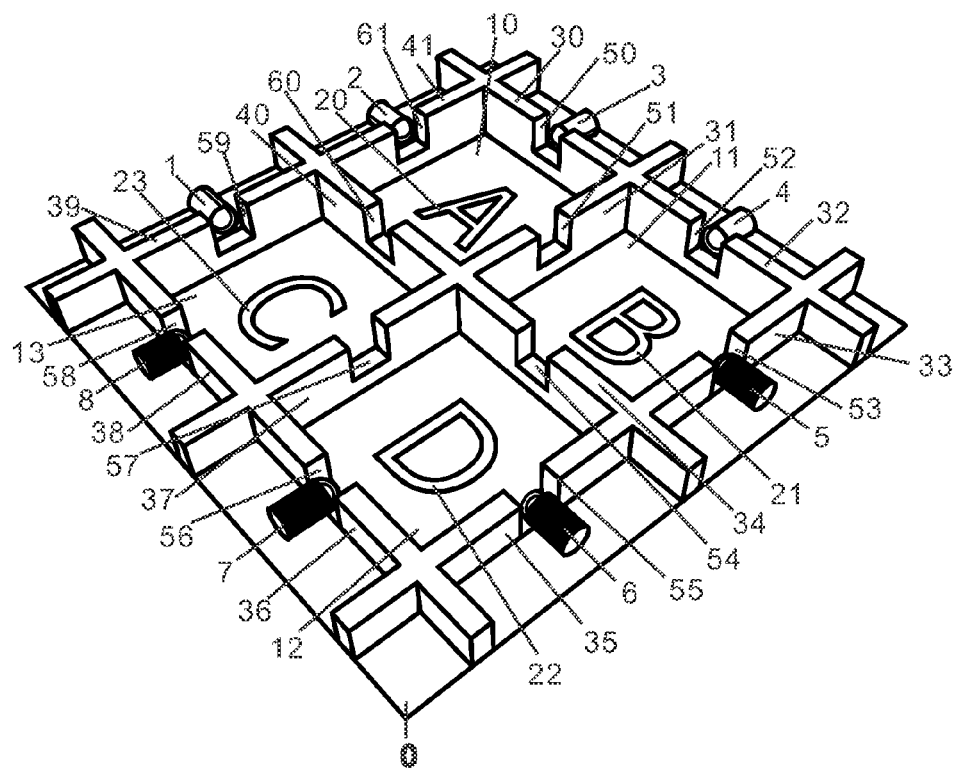
Fig. 4 Separation walls with slits for light beam keyboard

MEANS FOR SETTING SEPARATION WALLS WITH PREDETERMINED HEIGHTS AND SHAPES ON KEYPADS TO PREVENT UNINTENDED KEY HITS

BACKGROUND

Prior Art

Many electronic devices and equipments utilize keyboards or keypads to take user input. On each of these keypads, many keys are provided to be pressed down or touched upon to generate signals for processing.

On a keypad, a key is either bigger than the average size of a finger tip, or the distance between keys are longer than that of a finger. This is to avoid the "fat" finger phenomenon, i.e. when a key is pressed, the neighboring keys maybe pressed too due to the big size of a finger. However, on a regular sized keyboard, "fat" finger phenomenon may still occur because some fingers are much bigger than the average. Such size issues have limited the number of keys that can be put on a small device, such as a TV remote control, or a hand held phone set. As the TV set-top boxes are becoming more computer powered, and phones enable text communication, more keys are desired to be put on the small keypad.

On smaller hand-held devices and mini-sized keyboards, resistance has been added to the keys so that bigger forces are needed to press down a key. This is to prevent unintended key hits from random sources, but caused discomfort and may cause injuries for fingers with frequent use.

Another class of devices are the infrared touch screens and touchless keypads. This type of input devices utilizing crossing light beams as finger position detectors. When a pair of crossing light beams are blocked, a key triggering signal is generated. However, since such designs usually put keys in a unilocular area, keys may also be unintentionally triggered by the movement of the fingers over other keys, even if each key can take a big area. Input speed is usually very slow to avoid such unintended triggering for such devices.

SUMMARY

In accordance with one embodiment, some raised parts, called separation walls, can be established on the keypads so that when a key is hit, its neighboring keys can avoid being hit accidentally.

Accordingly several advantages of one or more aspects are as follows: more keys can be placed on a unit area of space; keys can take less force to press; movement of fingers will not trigger unintended keys. Other advantages of one or more aspects will be apparent from a consideration of the drawings and ensuing description.

DRAWINGS

FIGURES

FIG. 1 shows a keypad with both keys and separation walls protrude above the enclosure surface in accordance with one embodiment.

FIG. 2 shows a keypad that the separation walls are part of the enclosure surface, and the push-button keys are within cavities of the enclosure surface in accordance with another embodiment.

FIG. 3 shows a keypad that the separation walls are part of the enclosure surface, and the touch-sensing keys are beneath the enclosure surface in accordance with another embodiment.

FIG. 4 shows a keypad that the separation walls have slits in them to let light pass in accordance with another embodiment.

REFERENCE NUMERALS FOR FIG. 1, FIG. 2, AND FIG. 3

| 0 | top surface of the enclosure of a keypad | 11, 12, 13, 14 | labels on keys |
|---|---|---|---|
| 1, 2, 3, 4 | keys | 21, 22, 23, 24 | separation walls |

REFERENCE NUMERALS FOR FIG. 4

0—base area of the enclosure surface for keys
1, 2, 3, 4—light emitters
5, 6, 7, 8—light receivers
10, 11, 12, 13—key entry areas
20, 21, 22, 23—labels for keys
30, 31, 32, 33, 34, 35, 36, 37, 38, 39, 40, 41—separation walls
50, 51, 52, 53, 54, 55, 56, 57, 58, 59, 60, 61—slits on separation walls

DETAILED DESCRIPTION

FIG. 1 First Embodiment

One embodiment of the keypad is illustrated in FIG. 1. Keys 1, 2, 3, 4 and separation walls 21, 22, 23, 24 are all raised above the base 0, the surface of the enclosure. The key areas can be so small that when an average finger tip is centered on one of the keys, at least one of the other keys is also under the pressing range of the finger. But when a key is pressed down by the flesh tip of a finger, the separation walls can sustain other part of the finger and prevent the neighboring keys from being pressed down.

In this embodiment, the height of the keys and the separation walls don't need to be the same. But the keys need to be below the top surface of the separation walls to trigger a key entry signal. Any sticks that are thinner than the dimension of the keys can also be used to press down the keys.

FIG. 2 Second Embodiment

Another embodiment of the keypad is illustrated in FIG. 2. Keys 1, 2, 3, 4 are contained within the cavities of the enclosure shell 0. Separation walls 21, 22, 23, 24 are part of the enclosure shell. When the center of a finger tip is pressing at one of the keys, other part of the finger are supported by the separation walls so that the neighboring keys are not affected.

In this embodiment, the height of the keys don't have to be the same as the enclosure surface. They can be slightly above, at the same height, or slightly below the enclosure surface as long as the triggering position of a key is lower than the top surface of the separation wall. The force needed to press down a key can be very light as the enclosure surface 0 forms a natural protection of the keys from accidental triggering.

A stick that can fit into the cavity size easily can be used to press the keys efficiently.

FIG. 3 Third Embodiment

Another embodiment of the keypad is illustrated in FIG. 3. Keys 1, 2, 3, 4 are touch-sensing or light press keys that are positioned below the top surface of the enclosure shell 0. When the flesh of a finger tip is in touch with a key, separation walls 21, 22, 23, 24 can effectively block the rest of the finger from touching the neighboring key surfaces.

FIG. 4 Fourth Embodiment

Another embodiment of the keypad is illustrated in FIG. 4. Here light emitters 1, 2, 3, 4 emit light beams that are received by light receivers 5, 6, 7, 8. There are a pair of light beams crossing within each key areas 10, 11, 12, 13, above the key labels 20, 21, 22, 23. When a pair of crossing light beams are blocked, a key down signal is generated correspondent to the label underneath.

Surrounding each key area are separation walls 30, 31, 32, 33, 34, 35, 36, 37, 38, 39, 40, 41 that have slits 50, 51, 52, 53, 54, 55, 56, 57, 58, 59, 60, 61 to let enough light beams pass through. These walls are high enough so that only when a finger tip or a stick is put deep enough inside the cell, can a light beam be blocked. Such walls are effective to prevent crossing light beams from being hit unintentionally by moving or fat fingers.

Advantages

From the description above, a number of advantages of some embodiments of my separation walls for keypad keys become evident:
(a) Because the separation walls can prevent neighboring keys from being unintentionally affected, the keys can be made small so that more keys can be placed in a unit area.
(b) Because the separation walls provide protections to the keys, the force needed to trigger a key can be reduced to be very small.
(c) In the case of the input devices utilizing light beams, the separation walls with slits not only can prevent unintended key hits, but also provide a tactile feedback that can enable the usage of multiple fingers and increase the input speed.

CONCLUSION, RAMIFICATIONS, AND SCOPE

Accordingly, the reader will see that the keypads with separation walls of the various embodiments can be used to reduce the size of the keys, increase the number of keys on a unit area, reduce the forces needed to trigger a key, and to increase the input speed.

Although the description above contains many specificities, these should not be construed as limiting the scope of the embodiments but as merely providing illustrations of some of the embodiments. For example, the separation walls can have other shapes such as rounded corners and be more fit to finger tips, or made of soft materials that makes touching comfortable, or have different colors from the enclosure surface to be conspicuous.

Thus the scope of the embodiments should be determined by the appended claims and their legal equivalents, rather than by the examples given.

I claim:

1. An input device comprising: (a) a plurality of keys that generate input signals when triggered, (b) a plurality of separation walls between said plurality of keys, and (c) means for setting said plurality of separation walls with predetermined heights, shapes, and relative positions to said plurality of keys such that the height of said plurality of separation walls is above the top surfaces of said plurality of keys when said plurality of keys are pressed down enough for triggering signals so that when a finger with size bigger than the unit size of the said plurality of keys is pressing on one of said plurality of keys, a neighboring plurality of keys are shielded from said finger, whereby more keys with smaller unit sizes than said finger are put on a surface of said input device and are operated with less force and higher speed.

2. An input device comprising: (a) a plurality of light emitters that can emit light beams with predetermined spectra, (b) a plurality of light receivers that can generate electrical signals upon changes of received said light beams from said light emitters, (c) said plurality of light emitters and said plurality of light receivers are placed around a panel with a plurality of key labels so that each of said plurality of light receivers is facing one of said plurality of light emitters and form a one to one light emitter-receiver pair across said panel, (d) there are two of said light beams crossing above each of said plurality of key labels such that blocking said crossing light beams can uniquely determine the location of one of the plurality of key labels being hit and trigger a key-down signal, (e) a plurality of separation walls in between each said light emitter-receiver pair and between any two of said plurality of key labels to prevent unintended triggering, (f) each of said plurality of separation walls has a transparent portion or slits to let a predetermined amount of said light beams pass through in between said light emitter-receiver pairs, (g) a finger can trigger a key-down signal only by blocking said crossing light beams when placed between two neighbors of said plurality of separation walls and below the top of said plurality of separation walls, whereby said input device avoids unintended triggering and has a faster input speed.

3. A method for preventing a finger blocking unintended light beams when operating a touchless keypad of crossing light beams comprising: (a) a plurality of light emitter-receiver pairs of which a light emitter and a receiver face each other across a panel of a plurality of key labels, (b) two of said light beams crossing above each of said plurality of key labels, (c) a plurality of separation walls between any two of said plurality of key labels and between said light emitter and said light receiver of each of said plurality of light emitter-receiver pairs, (d) each of said plurality of separation walls has a transparent portion or slits to let a predetermined amount of said light beams from any said light emitter pass through to reach said light receiver of corresponding said light emitter-receiver pair, (e) said finger can only block said light beams when placed between intended said separation walls and reaching below the top of said separation walls so that the other part of said finger is raised up and not blocking any said light beams, whereby said input device can avoid unintended triggering and have a faster input speed.

* * * * *